(12) United States Patent
Matzenmüller et al.

(10) Patent No.: US 7,402,035 B2
(45) Date of Patent: Jul. 22, 2008

(54) APPARATUS FOR DEEP DRAWING A THERMOPLASTIC FOIL

(75) Inventors: Jürgen Matzenmüller, Bellamont (DE); Jörg Knüppel, Schwendi (DE)

(73) Assignee: Uhlmann Pac-Systeme GmbH & Co. KG, Laupheim (DE)

(*) Notice: Subject to any disclaimer, the term of this patent is extended or adjusted under 35 U.S.C. 154(b) by 263 days.

(21) Appl. No.: 11/264,761

(22) Filed: Nov. 1, 2005

(65) Prior Publication Data

US 2006/0099292 A1  May 11, 2006

(30) Foreign Application Priority Data

Nov. 10, 2004  (DE) .................. 10 2004 054 219

(51) Int. Cl.
*B28B 13/02* (2006.01)
(52) U.S. Cl. .................. 425/388; 425/395; 425/398; 425/412
(58) Field of Classification Search .......... 425/388, 425/395, 398, 412
See application file for complete search history.

(56) References Cited

U.S. PATENT DOCUMENTS

| | | | | |
|---|---|---|---|---|
| 3,193,881 | A * | 7/1965 | Kostur | 425/292 |
| 4,304,178 | A * | 12/1981 | Haberle | 100/323 |
| 4,909,722 | A * | 3/1990 | Wakayama et al. | 425/384 |
| 5,182,121 | A * | 1/1993 | Miyashita et al. | 425/338 |
| 5,230,910 | A * | 7/1993 | Eggert | 425/385 |
| 5,262,181 | A | 11/1993 | Torterotot | |
| 5,385,465 | A * | 1/1995 | Greiwe et al. | 425/308 |
| 5,460,497 | A * | 10/1995 | Vismara | 425/4 R |
| 5,901,599 | A | 5/1999 | Sato | 72/350 |
| 6,234,781 | B1 * | 5/2001 | Hicks et al. | 425/384 |
| 6,314,873 | B1 * | 11/2001 | Lee et al. | 100/35 |

FOREIGN PATENT DOCUMENTS

| | | |
|---|---|---|
| DE | 41 35 935 | 5/1993 |
| DE | 4135935 | 5/1993 |
| EP | 1 297 943 | 4/2003 |
| WO | 01/43947 | 6/2001 |
| WO | WO-01/43947 | 6/2001 |
| WO | WO-03/092981 | 11/2003 |

* cited by examiner

*Primary Examiner*—Yogendra Gupta
*Assistant Examiner*—Maria Veronica D Ewald
(74) *Attorney, Agent, or Firm*—Andrew Wilford

(57) ABSTRACT

An apparatus for thermoshaping a thermoplastic foil has a lower tool carried on the frame and having an upper face formed with an array of upwardly open mold cavities, and an upper beam vertically displaceable above the lower tool. A punch plate fixed on the upper beam is provided with an array of downwardly projecting punches fittable in the cavities. A hold-down plate below the punch plate is limitedly vertically shiftable relative thereto. The hold-down plate is formed with an array of holes through which pass the punches. An actuator downwardly shifts the upper beam when the foil is extending horizontally between the lower tool and the hold-down plate for first pressing the foil with the hold-down plate against the upper face of the lower tool and then pushing the punches through the holes against the foil into the cavities to form pockets in the foil at the cavities.

14 Claims, 8 Drawing Sheets

APPARATUS FOR DEEP DRAWING A THERMOPLASTIC FOIL

FIELD OF THE INVENTION

The present invention relates to a deep-drawing apparatus. More particularly this invention concerns such an apparatus used for making blister packs from a thermoplastic foil.

BACKGROUND OF THE INVENTION

An apparatus for deep drawing a thermoplastic foil for the manufacture of blister packs as used in the packaging of pills or the like has an upper tool and a lower tool that are movable relative to each other and to a foil plane extending between them. As described in EP 1,297,943 the lower tool can be moved by a first actuator, and the upper tool is provided with an extender on a rod that is mounted on another actuator. The upper tool also has a separate seal piston that has its own actuator. With this apparatus the foil extending between the upper tool and the lower tool is first gripped by moving the lower tool and then is stretched by advance of the extender, and finally is given its final shape by movement of the seal piston. The numerous independent drives complicate this apparatus and make it expensive and cost inefficient.

The thermoshaper in WO 01/43947 of Hilpert has a complex arrangement of a spring-loaded hold-down plate and means for feeding air pressure through individual plungers to the foil to assist in the thermal deformation. This arrangement is complicated and requires substantial refitting when the arrangement of the blisters to be formed changes.

Similarly, German 41 35 935 uses a lower tool having an array of cavities that can be evacuated to form blisters in the foil. Such an arrangement also requires a complex and expensive lower tool and makes it very difficult to change blister format.

OBJECTS OF THE INVENTION

It is therefore an object of the present invention to provide an improved thermoshaper.

Another object is the provision of such an improved thermoshaper that overcomes the above-given disadvantages, in particular that forms an array of accurately shaped blisters or pockets in a thermoplastic foil using tools that are relatively simple.

SUMMARY OF THE INVENTION

An apparatus for thermoshaping a thermoplastic foil has according to the invention a stationary frame, a lower tool carried on the frame and having an upper face formed with an array of upwardly open mold cavities, and an upper beam vertically displaceable on the frame above the lower tool. A punch plate fixed on the upper beam is provided with an array of downwardly projecting punches fittable in the cavities. A heater is connected to these punches. A hold-down plate below the punch plate is limitedly vertically shiftable relative thereto. The hold-down plate is formed with an array of holes through which pass the punches, and this hold-down plate is actively cooled. An actuator downwardly shifts the upper beam when the foil is extending horizontally between the lower tool and the hold-down plate for first pressing the foil with the hold-down plate against the upper face of the lower tool and then in an end position pushing the punches through the holes against the foil into the cavities to form pockets in the foil at the cavities.

The use of heated punches and a cooled hold-down plate ensures that the foil will be deformed only at the cavities, and that the foil will not stick to the lower face of the hold-down plate. In addition a separate punch drive is not needed, since the punch plate moves together with the upper beam because it forms with the upper beam an upper tool.

The holes according to the invention loosely receive the respective punches and the punches fit loosely in the respective cavities in the end position. A seal ring between the hold-down plate and the punch plate extends around all of the punches and defines a pressurizable chamber when the punch plate is pressed by the actuator down against the hold-down plate. Means is provided for pressurizing the chamber with a gas and thereby forcing the gas through the holes down against the foil and pressing the foil tightly into the cavities. Thus the final shaping of the foil to conform to the cavities of the lower tool is done pneumatically, not by the tools. This ensures gentle treatment of the foil and makes it possible to use punches that do not have to be expensively manufactured to fit perfectly in the cavities. Furthermore sticking of the foil to the hot punches is largely avoided, since these punches only serve in a preshaping step and, when the chamber is pressurized, the foil is pushed off the punches.

The punch plate and punches are formed of a heat-conducting material, e.g. aluminum. The heater is connected directly to the punch plate so that the punches are heated conductively. In addition a cooler adjacent the frame is connected by a flexible hose to the hold-down plate.

The thermoshaping apparatus further has according to the invention a base plate fixed to the upper beam above the punch plate. The punch plate is fixed via the base plate to the upper beam. The base plate has a central mounting pin at which the punch plate is fixed and that defines an upright axis. One of the punch and base plates is formed with a plurality of slots aligned radially with the axis and the other of the punch and base plates is formed with a plurality of axially extending guides fitting and slidable radially in the respective slots so that, on heating and radial expansion of the punch plate, the guides shift radially in the respective slots. The slots are open outward at outer edges of the one of the base and punch plates, and the guides are cylindrical pins extending parallel to the axis. This allows the punch plate to expand thermally and, since its punches fit loosely in the hold-down plate holes and in the lower-tool cavities, such expansion is not a problem.

According to the invention insulating spacers are provided between the base plate and the punch plate. This saves energy and prevents the base plate and upper beam from thermally expanding when the punch plate is heated.

In addition further spacers are provided for limiting penetration of the punches into the cavities. Such spacers can be provided in the guides around the pins.

According to the invention a lower beam on the frame carries the lower tool. The actuator is connected to the lower beam for shifting the lower beam and lower tool synchronously and oppositely to the upper beam. Thus as the upper tool formed by the upper beam, base plate, hold-down plate, and punch plate moves downward, the lower tool moves upward, and vice versa. The frame according to the invention includes vertical tie rods on which the beams can slide vertically.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
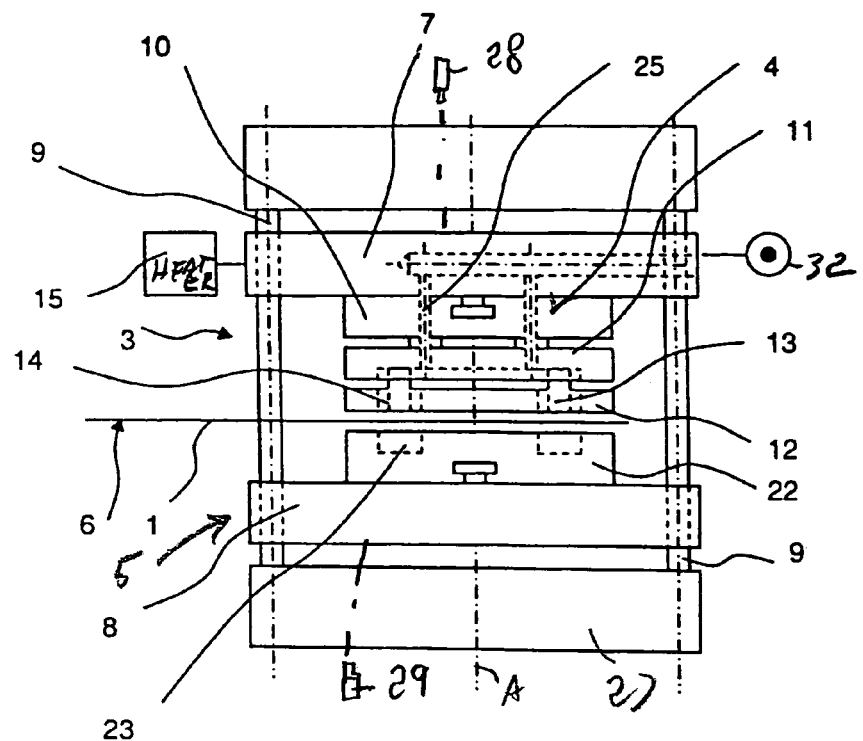
FIG. 1 is a front view of an apparatus according to the invention at the start of a shaping cycle.
Figure 2:
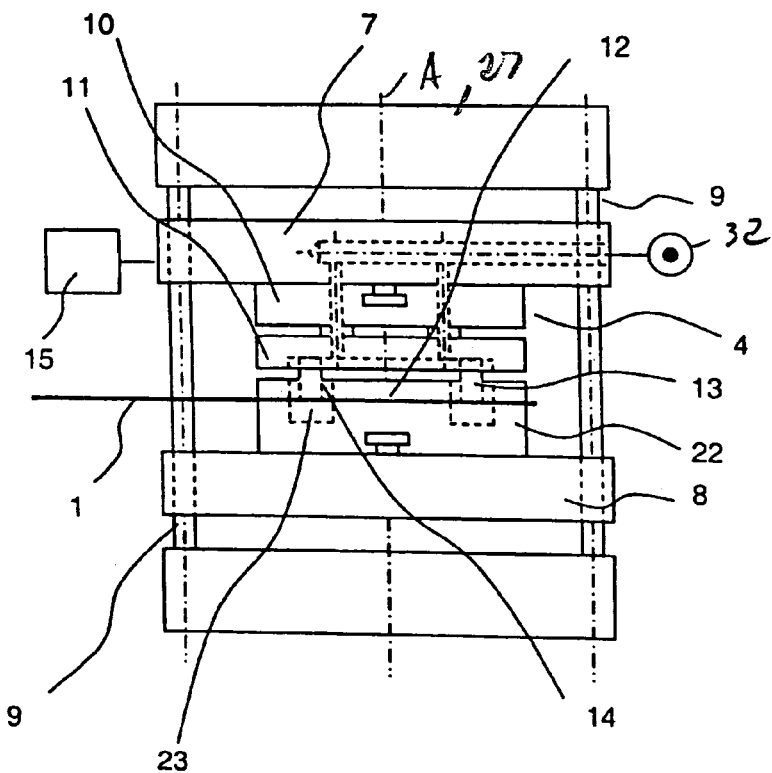
FIG. 2 is a view like FIG. 1 with the upper and lower tools engaging the foil.
Figure 3:
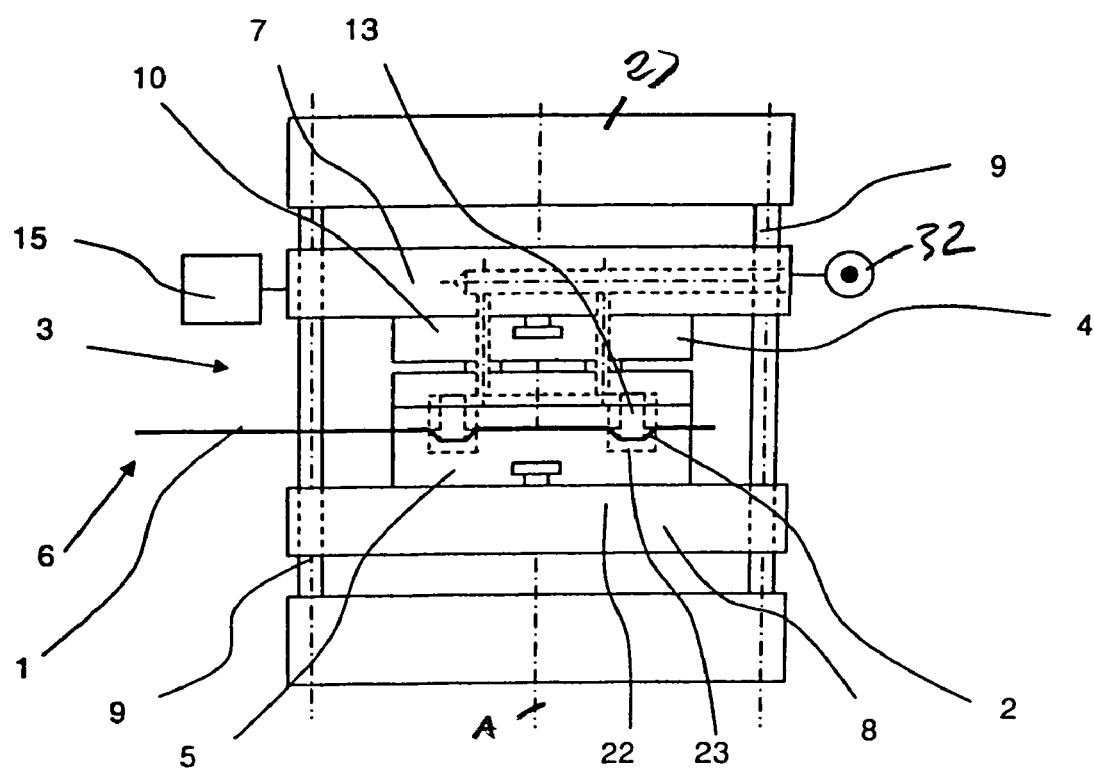
FIG. 3 is a view like FIG. 1 with the upper beam advanced into an end position to make blisters in the foil.
Figure 4:
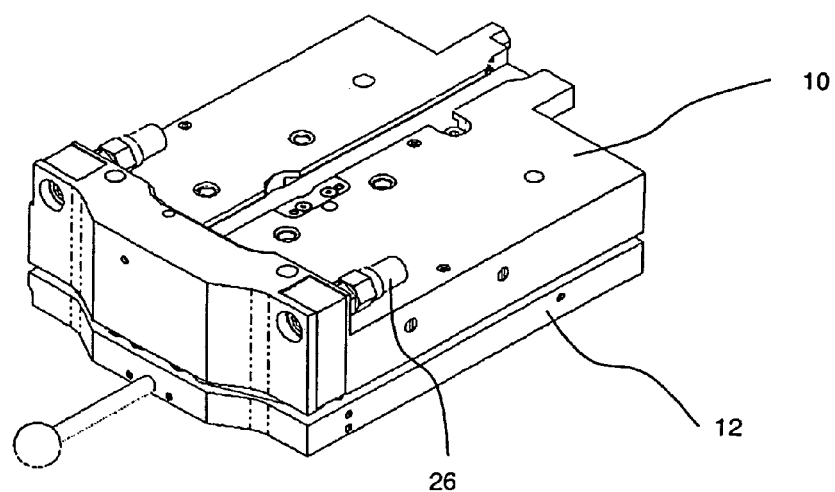
FIG. 4 is a perspective view of the upper tool.

As seen in FIGS. 1-3 a thermoshaping machine packages measured quantities of capsules, pills, tablets, or the like in a foil 1, to which end blisters 2 are formed in the foil 1, are filled with the product in a downstream filler, and then in a sealer further downstream in the foil-travel direction are sealed by a cover foil. Then a downstream stamper separates the filled and sealed blister packs from one another.

Such a thermoshaping machine has a shaping apparatus 3 for forming the blisters 2 by deep drawing the thermoplastic foil 1. The apparatus has an upper tool 4 and a lower tool 5 that are movable vertically along a central axis A relative to each other and to a horizontal foil plane 6 between them. The upper tool 4 includes a vertically displaceable upper transverse beam 7 and the lower tool 5 includes a lower transverse beam 8. The upper beam 7 and lower beam 8 can slide vertically on tie rods 9 connected to a stationary frame 27 and are shifted vertically by respective drives shown schematically at 28 and 29.

The upper tool 4 carried on the beam 7 is comprised of a base plate 10 fixed on the upper beam 7, a punch plate 11 fixed on the base plate 10, and a hold-down plate 12 movable relative to the punch plate 10 and formed with an array of holes 14 through which engage punches 13 of the plate 11. The punch plate 11 is made of a heat-conducting material, preferably aluminum, and can be heated as shown schematically by the variable heater 15 in FIGS. 1 and 3. Since the punch plate 11 is fixed by the base plate 10 to the upper beam 7, it is not necessary to provide the apparatus 3 with a flexible cable to feed an electric resistance heater, instead a rigid cable and plug suffice.

Figure 6:
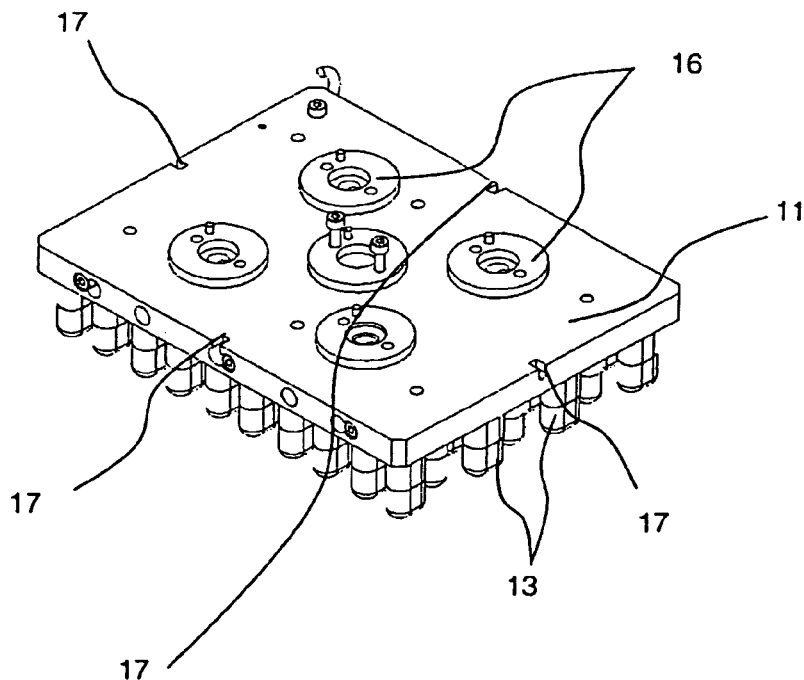
FIG. 6 is a perspective view of the insulated punch plate of the upper tool.
Figure 7:
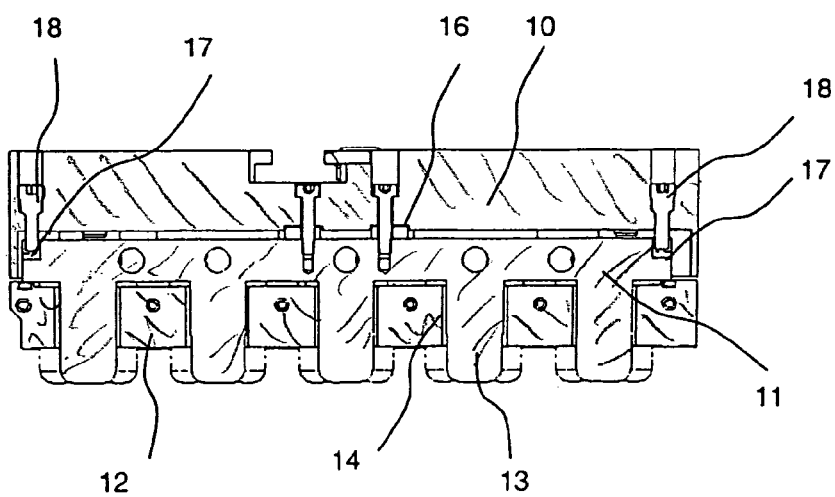
FIG. 7 is a vertical section through the upper tool of FIG. 4 in pushed-together condition.
Figure 8:
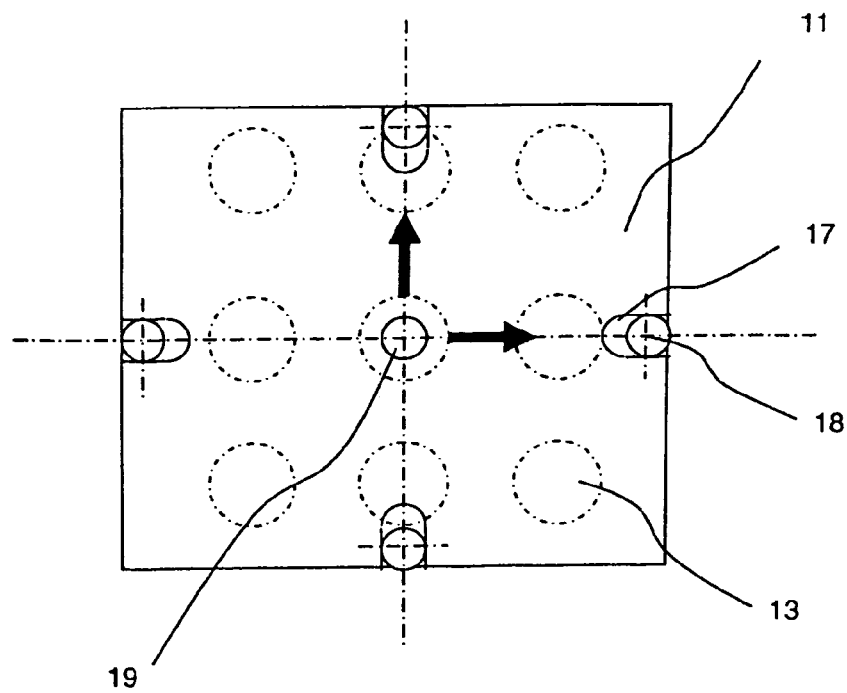
FIG. 8 is a top view of the punch plate with the guide pins of the base plate engaged in their guides.

Between the hold-down plate 12 and the punch plate 11 there are spacer plates 16 (FIG. 6) that are thermally insulating in order to reduce heating of the base plate 10. The punch plate 11 is fixed at a central cylindrical pin 19 to the base plate 10 and thus is very accurately positioned in the machine frame 27 via the base plate 10 and the upper beam 7. Such mounting allows the punch plate 11 to thermally expand radially of the axis A out from the center pin 19 as shown in FIG. 8, to which end cylindrical pins 18 engage in respective radially outwardly open guide slots 17. FIGS. 6 and 7 also show how the guide slots 17 are formed in the centers of outer edges in the punch plate 11 and the guide pins 18 are mounted on the base plate 10 at the outer edges thereof, the diameter of the pins 18 being essentially the same as the width of the slits 17. The hold-down plate 12 is mounted so that it can move vertically limitedly relative to punch plate 11, normally returning by gravity to a lower position.

Figure 9:
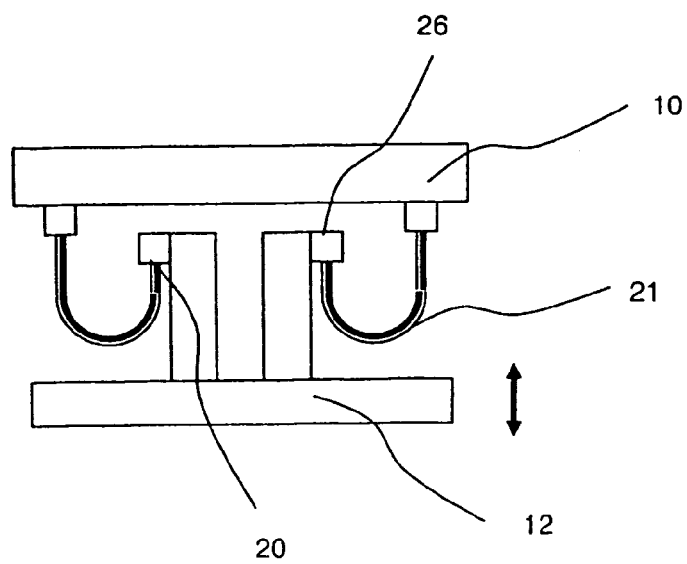
FIG. 9 is a schematic representation of the connection formed by two hose loops between the hold-down plate and the base plate.
Figure 10A:
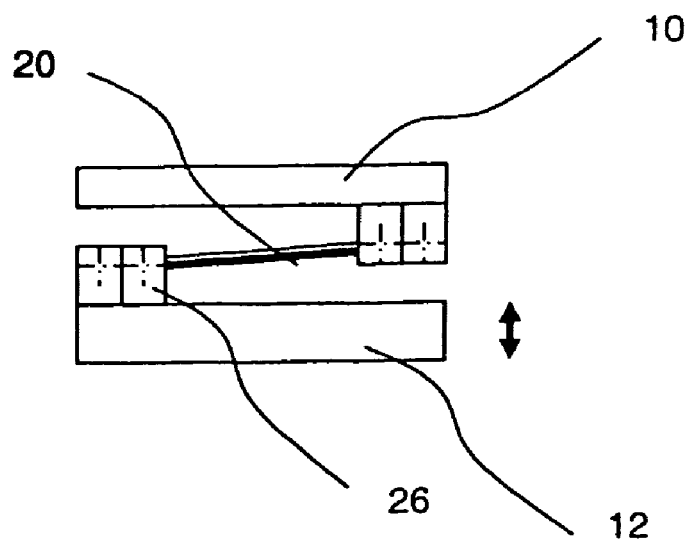
FIGS. 10a and 10b are side and bottom views of another type of connection of a coolant hose between the hold-down plate and the base plate.
Figure 10B:
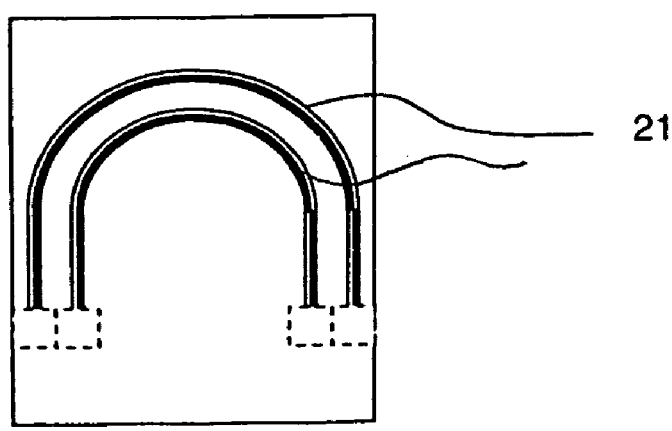

Coolant connections 26 (FIG. 5) are mounted on the hold-down plate 12 and flexible coolant hoses 20 forming loops 21 are connected to the connections 26 in order to compensate for the relative movement of the hold-down plate 12 and the base plate 10. FIGS. 9 and 10 show two alternative hose arrangements, one (FIG. 9) with bending of the coolant hose 20 and the other (FIG. 10) with twisting. The outer ends of the incoming and outgoing coolant hoses 20 are connected to a cooler 31.

Figure 5:
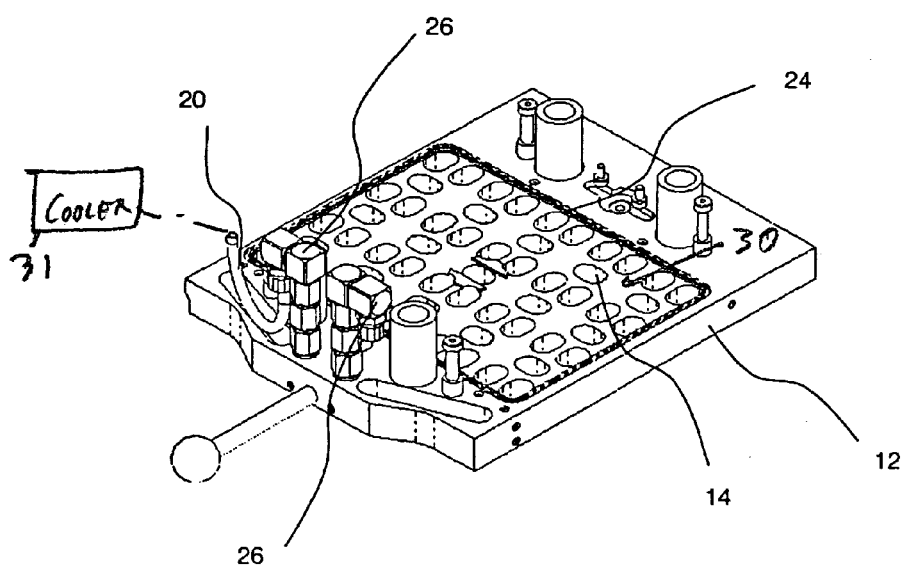
FIG. 5 is a perspective view of the insulated hold-down plate of the upper tool.

As shown in FIG. 5, the lower tool 5 is formed as a cavity plate 22 with an array of upwardly open pockets or cavities 23 aligned with the punches 13 of the plate 11. FIG. 5 shows that the face of the hold-down plate 12 turned toward the punch plate 11 has an annular seal 24 surrounding the array of pockets 23. A pressure line 25 connected to a source 32 of air under pressure opens into the chamber 30 defined within the seal 24 between the punch plate 11 and the hold-down plate 12 so that in the FIG. 3 end position it is possible once the preshaping of the foil 1 has been done by the punches 13 to effect the final shaping by pressurization. To this end it is significant that the chamber 30 be of limited volume so it can be pressurized rapidly.

Figure 11:
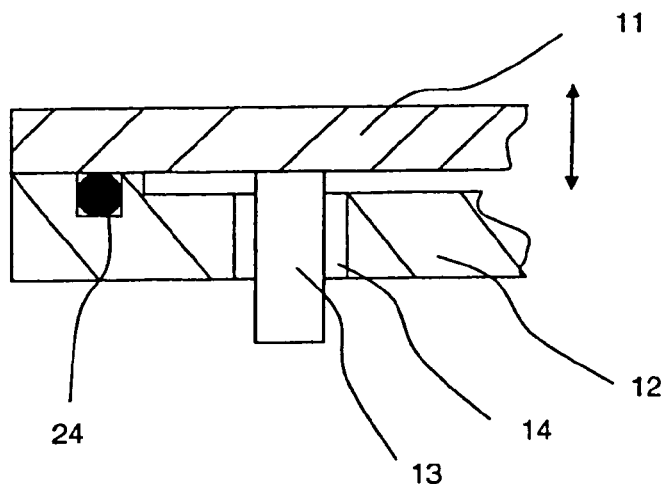
FIG. 11 is a schematic representation of a static seal between the hold-down plate and the punch plate.
Figure 12:
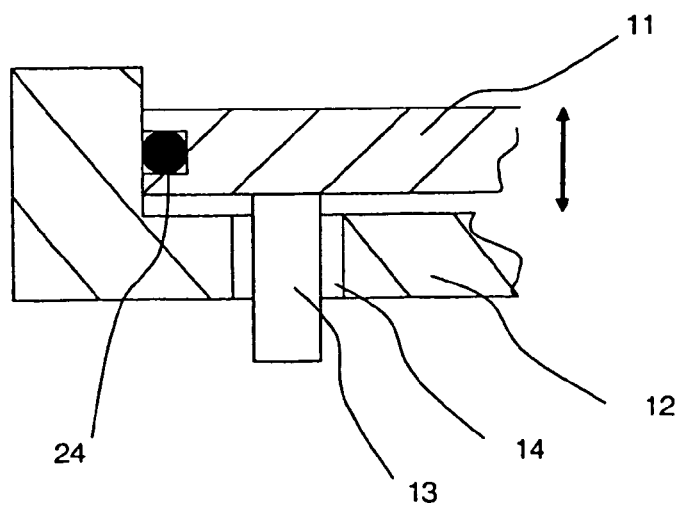
FIG. 12 is a view like FIG. 11 showing a dynamic seal between the punch plate and the hold-down plate.

FIG. 5 shows a static seal set in an upper face of the punch plate 11 and bearing upward on the lower face of the hold-down plate as also illustrated in FIG. 11. It is also possible to seal dynamically as shown in FIG. 12 with a wear-resistant seal 24 set in an outer edge of the punch plate 11 and bearing outward on an annular inner face of the hold-down plate 12.

Figure 13:
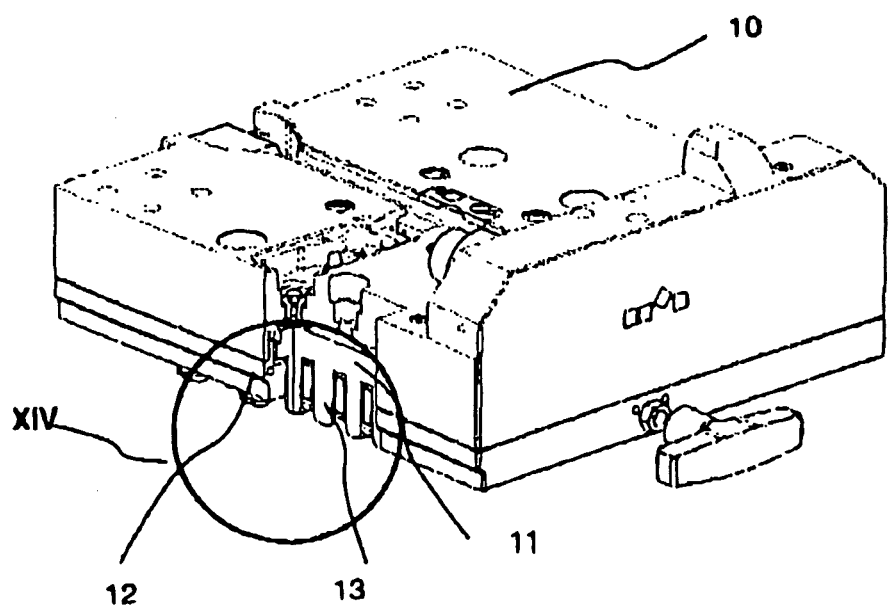
FIG. 13 is a partly broken-away perspective view of the base, punch, and hold-down plates.
Figure 14:
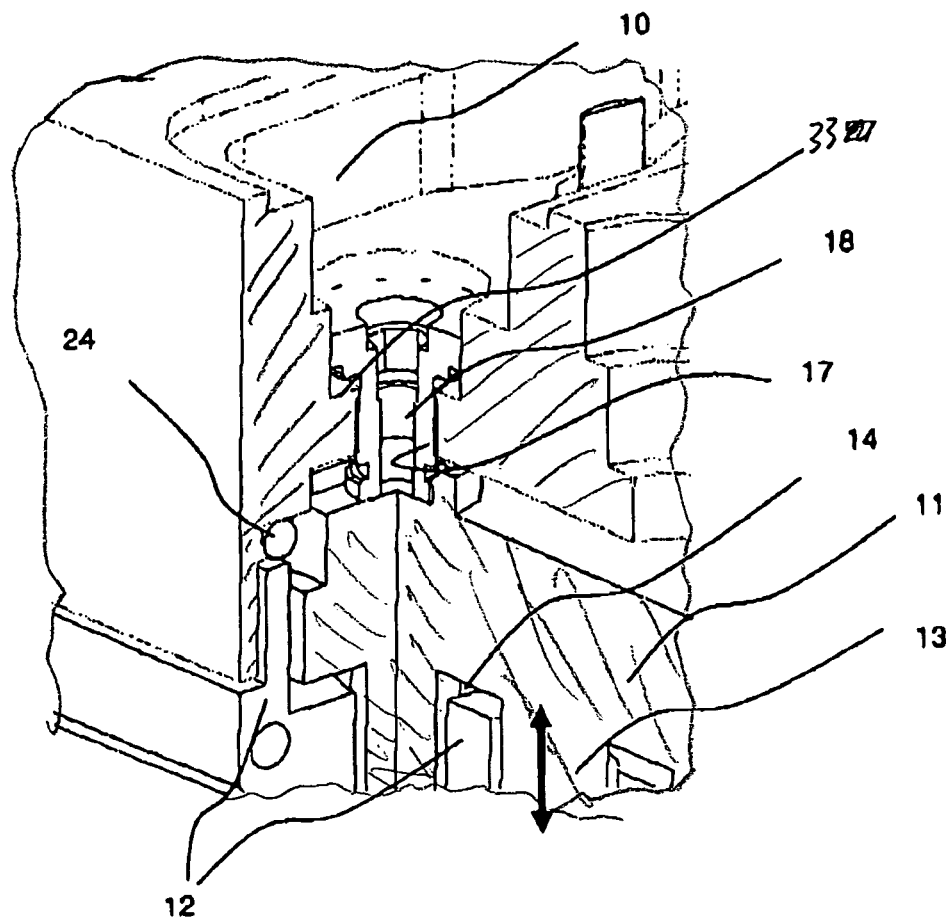
FIG. 14 is a large-scale view of the detail indicated at XIV in FIG. 13.

As shown in FIGS. 13 and 14, spacer disks 33 limit displacement of the punch plate 11 relative to the hold-down plate 12. The spacer disks 33 are provided in the guide slots 17 so as to limit the extent of insertion of the respective guide pins 18 in the respective guide slots 17. In the embodiment shown in the drawing the spacer disks 33 are unitary with the base plate 10 and form annular rims of the base plate 10 projecting into the guide slots 17 and forming abutments for the guide pins 18.

With this system the foil 1 is moved in steps on the plane 6. When it stops as shown in FIG. 1, the actuators 28 and 29 shift the lower tool 5 up so it engages the bottom face of the foil 1, and the top tool 4 is moved downward. In a first position as shown in FIG. 2, the hold-down plate 12 engages the top face of the foil 1 and presses it down against the upper face of the lower tool 5.

Then as the beam 7, base plate 10, and punch plate 11 continue to move downward relative to the now stationary lower tool 5 and hold-down plate 12, the punches 13 move downward in their holes 14 and engage the foil 1. Since these punches 13 are hot, they plastically deform the foil 1 and push it down into each of the cavities 23. Meanwhile the foil 1 is gripped between the cavities 23 between the cool lower face of the hold-down plate 12 and the upper face of the cavity plate 22. The parts are in the position of FIG. 3.

In this position the supply 32 is actuated to pressurize the chamber 30, and the pressurized air flows through the holes 14, which are not completely blocked by the plungers 13, so that the foil 1 is forced pneumatically downward in the cavities 23 to conform closely to their shapes, creating the blisters 2. This action also pushes the foil 1 down off the plungers 13.

The actuators 28 and 29 then reverse to pull the lower tool 5 down away from the foil 1, now formed with blisters 2, and to pull the entire upper tool 4 up away from the foil 1 also. There is little likelihood of the foil 1 sticking to the tools 4 and 5 because it has already been separated from the hot punches 13 and is only engaged from above by a cooled part, the hold-down plate 12.

The foil 1 can then be stepped downward and the cycle repeated.

We claim:

1. An apparatus for thermoshaping a thermoplastic foil, the apparatus comprising:
    a stationary frame;
    a lower tool carried on the frame and having an upper face formed with an array of upwardly open mold cavities;
    an upper beam vertically displaceable on the frame above the lower tool;
    a punch plate fixed on the upper beam and provided with an array of downwardly projecting punches fittable in the cavities;
    means for heating the punches;
    a hold-down plate below the punch plate and limitedly vertically shiftable relative thereto, the hold-down plate being formed with an array of holes through which pass the punches and in which the punches are loosely received;
    means for cooling the hold-down plate;
    actuator means for downwardly shifting the upper beam when the foil is extending horizontally between the lower tool and the hold-down plate for first pressing the foil with the hold-down plate against the upper face of the lower tool and then in an end position pushing the punches through the holes against the foil into the cavities to form pockets in the foil at the cavities, the punches fitting loosely in the respective cavities in the end position;
    a seal ring between the hold-down plate and the punch plate, extending around all of the punches, and defining when the punch elate is pressed by the actuator means down against the hold-down plate a pressurizable chamber; and
    means for pressurizing the chamber with a gas and thereby forcing the gas through the holes down against the foil and pressing the foil tightly into the cavities.

2. The thermoshaping apparatus defined in claim 1 wherein the punch plate and punches are formed of a heat-conducting material, the heating means being connected directly to the punch plate, whereby the punches are heated conductively.

3. The thermoshaping apparatus defined in claim 1 wherein the cooling means includes a cooler adjacent the frame and a flexible hose between the cooler and the hold-down plate.

4. The thermoshaping apparatus defined in claim 1, further comprising
    a base plate fixed to the upper beam above the punch plate, the punch plate being fixed via the base plate to the upper beam.

5. An apparatus for thermoshaping a thermoplastic foil, the apparatus comprising:
    a stationary frame:
    a lower tool carried on the frame and having an upper face formed with an array of upwardly open mold cavities;
    an upper beam vertically displaceable on the frame above the lower tool;
    a punch plate fixed on the upper beam and provided with an array of downwardly projecting punches fittable in the cavities;
    means for heating the punches;
    a hold-down plate below the punch elate and limitedly vertically shiftable relative thereto, the hold-down plate being formed with an array of holes through which pass the punches;
    means for cooling the hold-down plate;
    actuator means for downwardly shifting the upper beam when the foil is extending horizontally between the lower tool and the hold-down plate for first pressing the foil with the hold-down plate against the upper face of the lower tool and then in an end position pushing the punches through the holes against the foil into the cavities to form pockets in the foil at the cavities and
    a base plate fixed to the upper beam above the punch plate, the punch plate being fixed via the base plate to the upper beam, the base plate having a central mounting pin at which the punch plate is fixed and defining an upright axis, one of the punch and base plates being formed with a plurality of slots aligned radially with the axis and the other of the punch and base plates being formed with a plurality of axially extending guides fitting and slidable radially in the respective slots, whereby on heating and radial expansion of the punch plate, the guides shift radially in the respective slots.

6. The thermoshaping apparatus defined in claim 5, further comprising
    means including spacers between the punch plate and the hold-down plate for limiting penetration of the punches into the cavities.

7. The thermoshaping apparatus defined in claim 6 wherein the spacers are disks surrounding the pins.

8. The thermoshaping apparatus defined in claim 5 wherein the slots are open outward at outer edges of the one of the base and punch plates.

9. The thermoshaping apparatus defined in claim 5 wherein the guides are cylindrical pins extending parallel to the axis.

10. The thermoshaping apparatus defined in claim 4, further comprising:
    insulating spacers between the base plate and the punch plate.

11. The thermoshaping apparatus defined in a claim 1, further comprising:
    a lower beam on the frame carrying the lower tool.

12. The thermoshaping apparatus defined in claim 11 wherein the actuator means is connected to the lower beam for shifting the lower beam and lower tool synchronously and oppositely to the upper beam.

13. The thermoshaping apparatus defined in claim 11 wherein the frame includes
    vertical tie rods on which the beams can slide vertically.

14. An apparatus for thermoshaping a thermoplastic foil, the apparatus comprising:
    a stationary frame;
    a lower tool carried on the frame and having an upper face formed with an array of upwardly open mold cavities;
    an upper beam vertically displaceable on the frame above the lower tool;
    a base plate fixed on the upper beam and having a central mounting pin defining an upright axis;
    a punch plate fixed to the pin of the base plate and provided with an array of downwardly projecting punches fittable in the cavities;
    means for heating the punch plate and punches, one of the punch and base plates being formed with a plurality of slots aligned radially with the axis and the other of the punch and base plates being formed with a plurality of axially extending guides fitting and slidable radially in the respective slots, whereby on heating and radial expansion of the punch plate, the guides shift radially in the respective slots;

a hold-down plate below the punch plate and limitedly vertically shiftable relative thereto, the hold-down plate being formed with an array of holes through which pass the punches;

means for cooling the hold-down plate; and actuator means for downwardly shifting the upper beam when the foil is extending horizontally between the lower tool and the hold-down plate for first pressing the foil with the hold-down plate against the upper face of the lower tool and then in an end position pushing the punches through the holes against the foil into the cavities to form pockets in the foil at the cavities.

* * * * *